Nov. 27, 1956     O. T. BENDICSEN     2,772,060

ACTUATING AND LOCKING MECHANISM

Filed Sept. 3, 1953     5 Sheets-Sheet 1

INVENTOR.
OLAF T. BENDICSEN
BY
*George C. Sullivan*
Agent

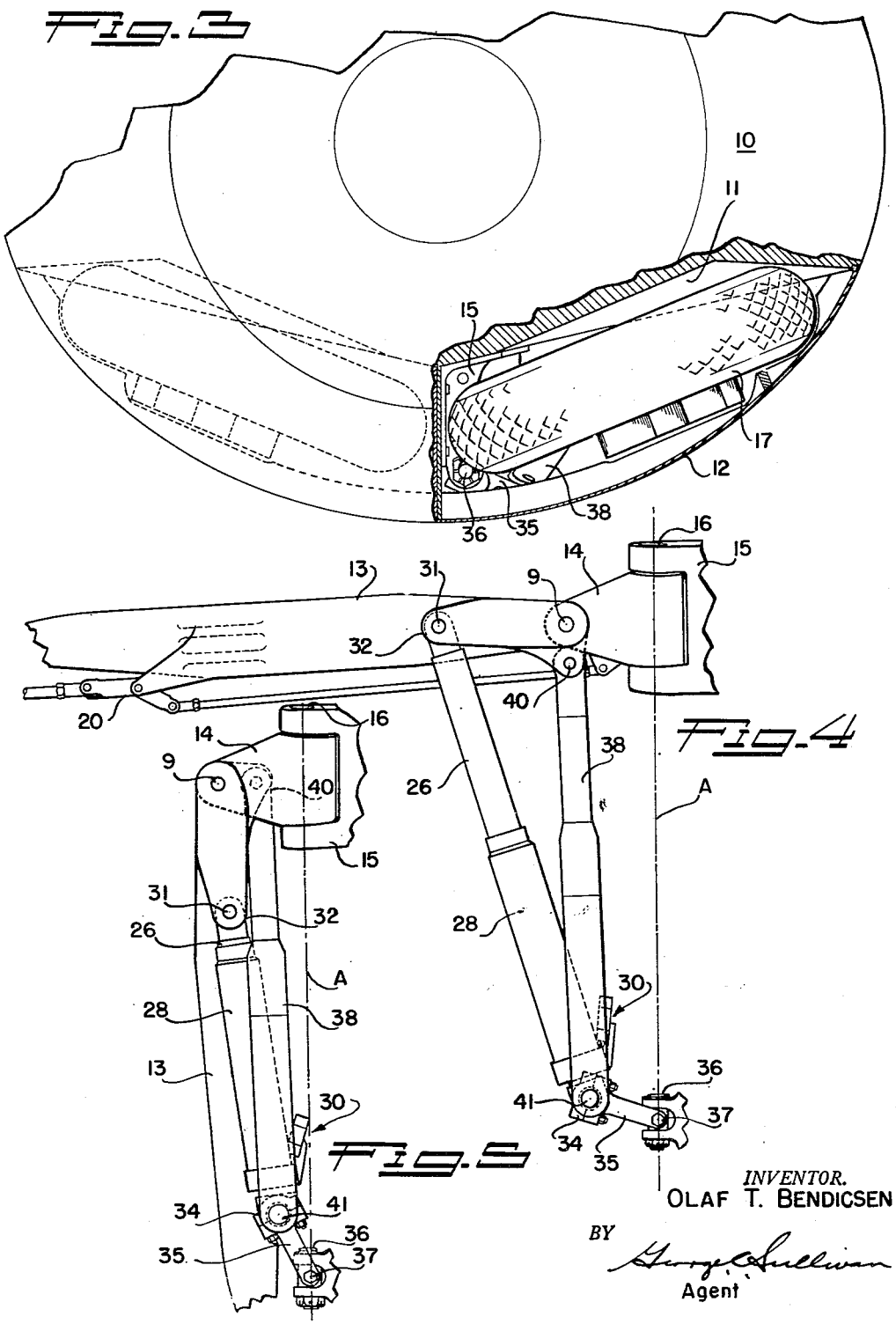

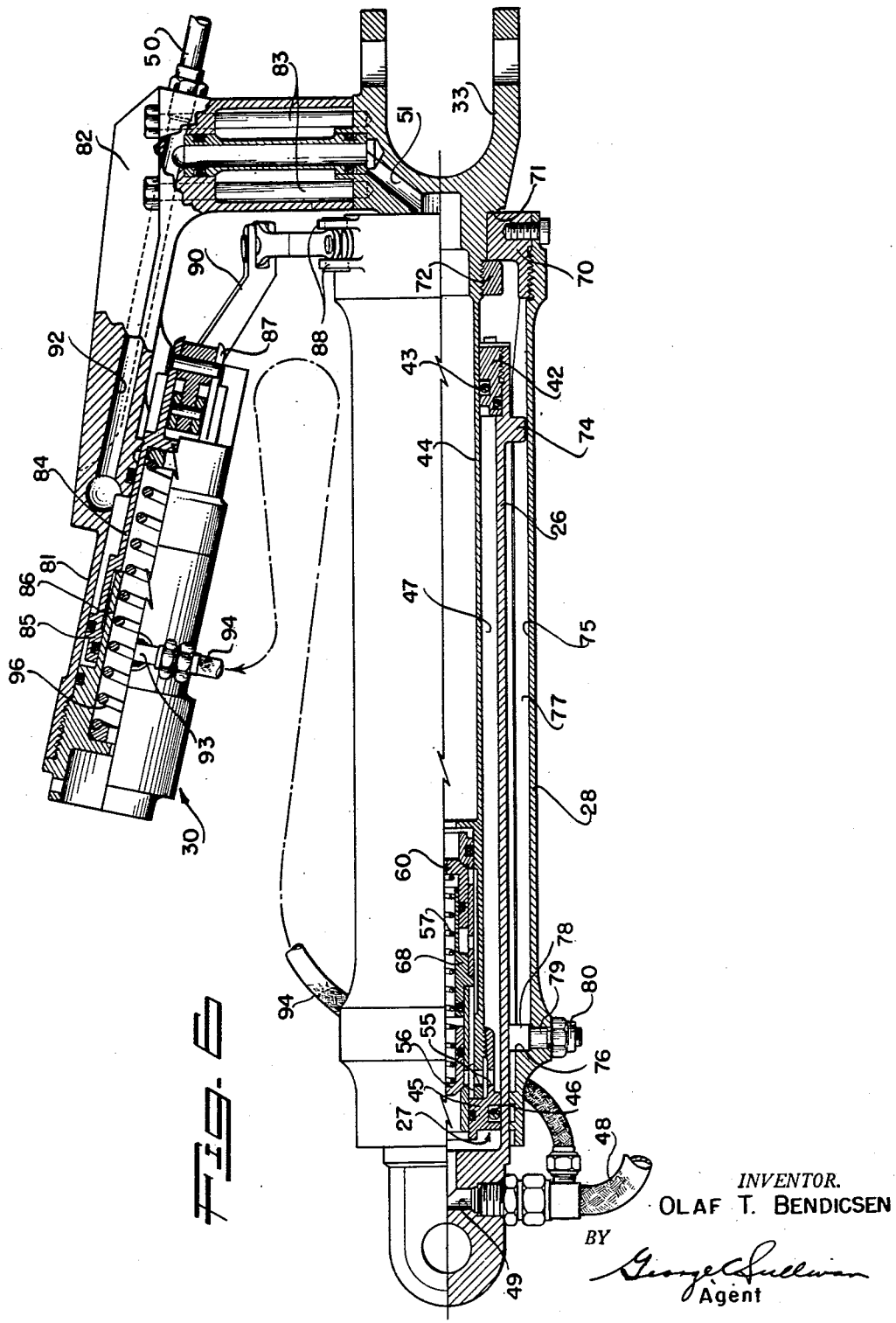

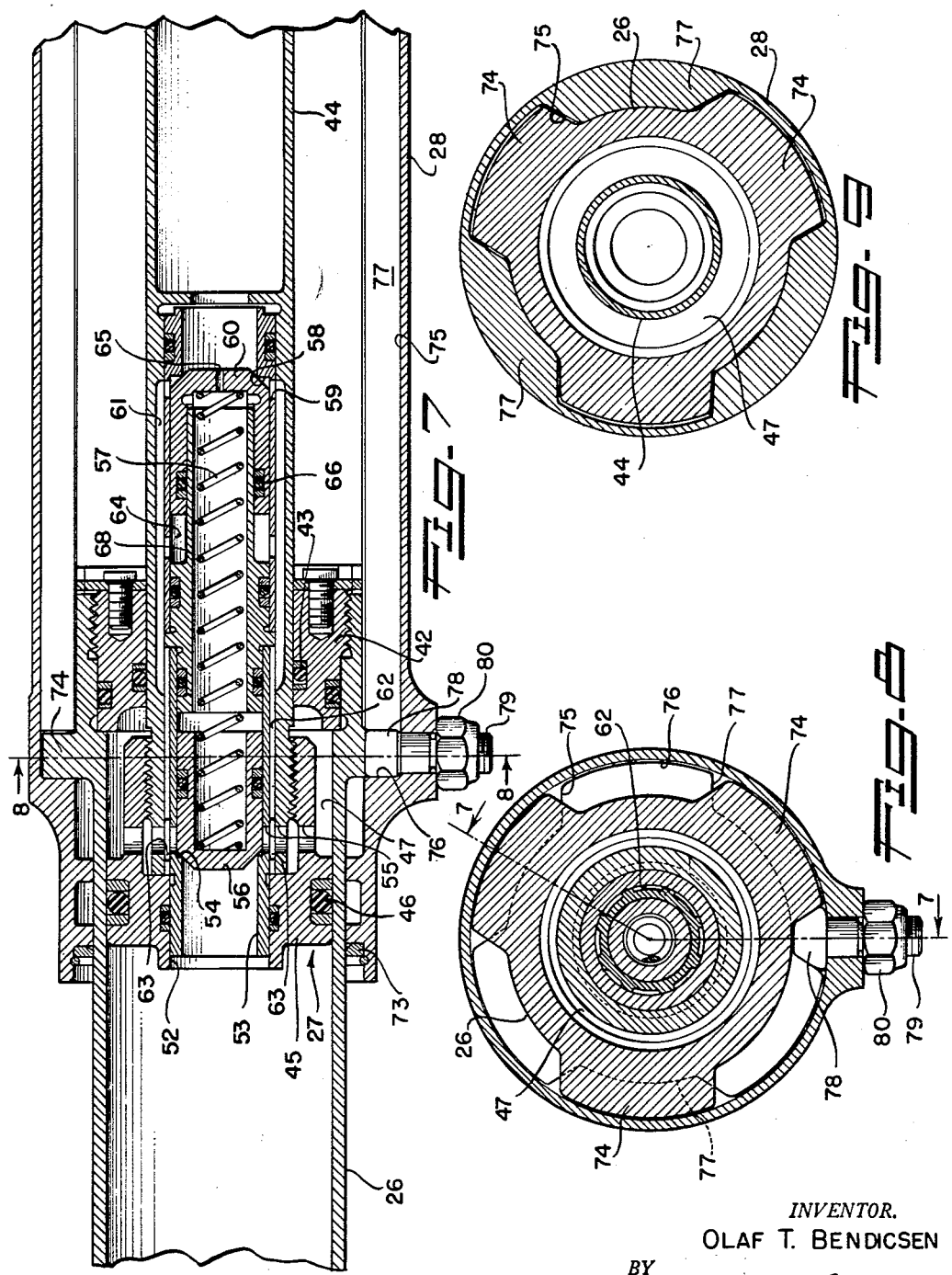

Nov. 27, 1956

O. T. BENDICSEN 2,772,060

ACTUATING AND LOCKING MECHANISM

Filed Sept. 3, 1953

INVENTOR.
OLAF T. BENDICSEN
BY
*George C. Sullivan*
Agent

United States Patent Office

2,772,060
Patented Nov. 27, 1956

2,772,060

ACTUATING AND LOCKING MECHANISM

Olaf T. Bendicsen, La Crescenta, Calif., assignor to Lockheed Aircraft Corporation, Burbank, Calif.

Application September 3, 1953, Serial No. 378,349

13 Claims. (Cl. 244—102)

This invention relates to the landing gear of aircraft and relates more particularly to mechanisms for extending and retracting such gear and for locking the same in the extended or active positions.

The present trend in aircraft design is toward high-speed craft presenting a minimum frontal area and having extremely thin wings. As a consequence there is much less stowage space available in such airplanes for accommodating the retracted landing gear than in the earlier or conventional airplanes. In fact, the stowage of the gear in modern or present-day high-speed aircraft has become a serious problem. Conventional landing gear extending and retracting systems include drag struts, separate actuating cylinders and downlock devices. In many instances these elements occupy more space than is conveniently available in the high-speed airplanes.

One object of this invention is to provide a landing gear extending and retracting mechanism and downlock means which occupies a minimum amount of landing gear stowage space.

Another object of the invention is to provide a landing gear extending and retracting means and downlock means that is positive and dependable in operation and that is constructed and designed whereby the downlocking of the landing gear is positively insured. The mechanism includes a valve means so constructed and arranged as to minimize the force or torque required to lock the gear in the down or extended position and to require that the unlocking force prior to gear retraction is greater than the locking force subsequent to extension of the gear. This safety feature insures that when the airplane is airborne with the landing gear retracted, the landing gear will surely and positively lock when extended.

Another and important object of the invention is to provide a landing gear mechanism of this kind characterized by a drag strut and actuating cylinder combination constructed and arranged to telescope or fit one within the other when the gear is retracted so as to occupy the bare minimum of stowage space in the airplane. The device includes a barrel type drag strut which slides or telescopes over the actuating cylinder and piston means when the gear is retracted to constitute an extremely compact, low-weight combination.

Still another object of the invention is to provide a landing gear actuating mechanism of the class referred to wherein the downlock elements are associated with or contained within the contractable telescopic strut and cylinder combination or unit and wherein the cylinder means for actuating the downlock may also be carried by this self-same unit to lie adjacent thereto whereby the entire assembly or mechanism is extremely compact.

A further object of the invention is to provide a landing gear actuating and locking mechanism of the character referred to suitable for use in conjunction with landing gear of various types and configurations with or without appropriate modification or adaptation.

Other objectives and features of the invention will become apparent from the following detailed description of a typical preferred embodiment throughout which description reference will be made to the accompanying drawings wherein:

Figure 3 is a fragmentary front elevation of a fuselage portion showing the landing gear of Figure 1 in the up or retracted position, with a part broken away to show one gear exposed;

Figure 4 is a fragmentary elevation of one of the gears illustrated in Figure 3 viewed from an inboard position when in the extended condition;

Figure 5 is a view similar to Figure 4 with the gear in the stowed or retracted condition;

Figure 6 is an enlarged longitudinal detailed sectional view of the gear actuating and locking means of the invention, with portions thereof appearing in elevation and showing the actuating cylinder and strut barrel in the retracted or contracted condition;

Figure 7 is an enlarged longitudinal detailed sectional view of a portion of the actuating cylinder and strut barrel combination in the actuated or extended condition and illustrating the details of the cylinder and piston arrangement and valve means;

Figure 8 is a transverse detailed sectional view taken as indicated by line 8—8 on Figure 7;

Figure 9 is a transverse detailed sectional view through the actuating cylinder and strut barrel, showing the locking lugs in an intermediate position in the splines or ways of the barrel.

Figures 1, 2:
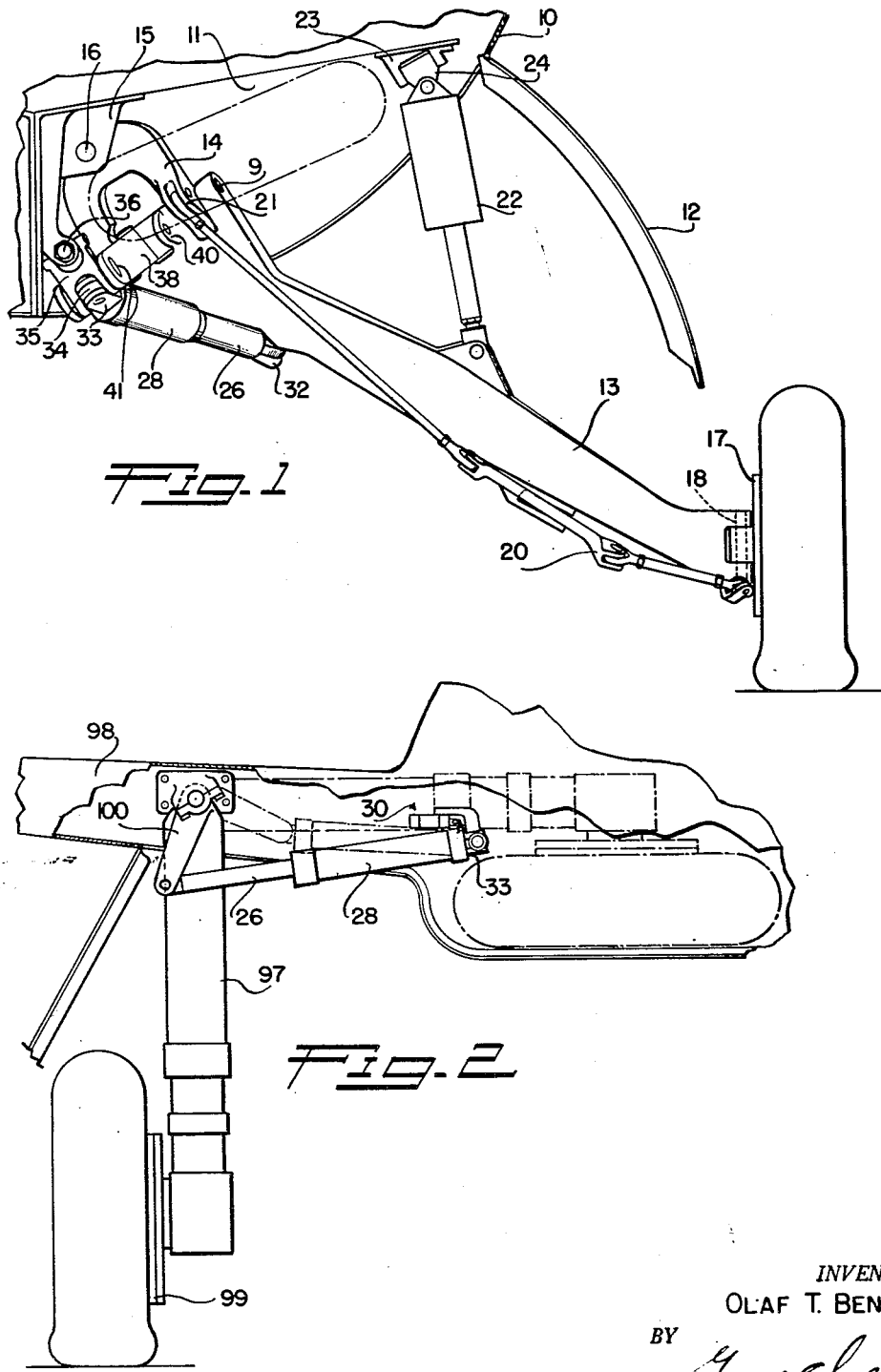
Figure 1 is a front elevation of a landing gear equipped with the mechanism of the invention in the down or extended condition, with broken lines illustrating the position assumed by the wheel when in the retracted position.
Figure 2 is a view similar to Figure 1 showing the mechanism of the invention associated with another type or class of landing gear, the full lines illustrating the gear in the extended position and the broken lines showing it in the up or retracted condition.
Figure 10:
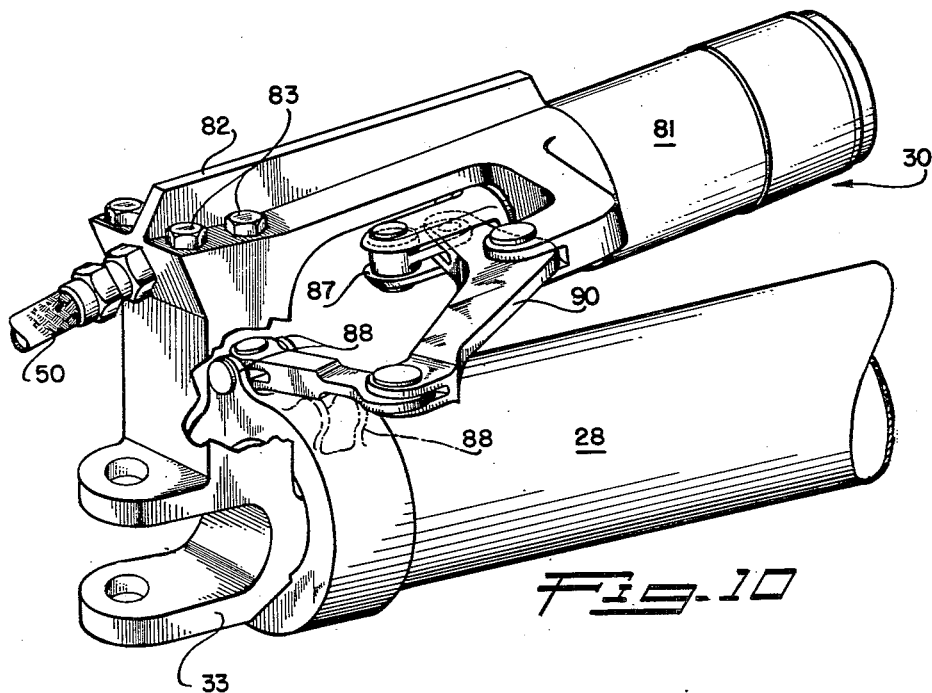
Figure 10 is a fragmentary perspective view illustrating the linkage connecting the downlock actuating cylinder and the barrel of the strut.

In Figures 1 and 3 to 10 inclusive, I have illustrated the invention embodied in landing gear for high velocity fighter airplanes, and the like, which gear is adapted to swing downwardly and outwardly from stowage compartments in the fuselage to extended ground engaging positions. A portion of the airplane fuselage is shown at 10 and has the stowage compartments 11 at each side of its centerline. Hinged doors 12 close the compartments 11 when the gear is retracted and stowed. As the two gears may be identical I will proceed with a description of one of them. Each landing gear includes a main member or strut 13 hinged or pivoted at its upper end by a double angular clevis or hinge arrangement. Thus, in Figure 1, it will be seen that the upper end of the strut 13 is yoked to receive a mounting arm 14 and the strut is hinged or pivoted thereto by a pin 9 passing through openings in the yoke and arm. The arm 14 in turn is pivoted in a bracket 15 secured to the fuselage structure, being adapted to have angular movement on a pin 16 about the axis A which may be termed the "retraction axis." A wheel 17 is mounted on the lower end of the main strut 13 and has angular movement about what may be termed a king pin 18. A system 20 of links extends between the wheel 17 and a lug 21 on the arm 14 and serves to move the wheel between the angular stowed position of Figure 5 and the active upright position of Figure 1 when the gear is extended and retracted. A shock absorbing cylinder and piston strut 22 is connected between the strut 13 and a mounting bracket 23 on the airplane structure. The shock strut 22, which may be of any selected or preferred type is pivotally mounted in the bracket 23 through the medium of a block 24 having an axis of pivotal or angular movement coincident with the axis of the above described hinge pin 9 of the strut 13. The invention is not primarily concerned with the details of the gear as thus far described except insofar as it may be employed therewith and form a combination therewith.

The invention provides a combination mechanism or unit associated or connected with the strut 13 and serving as a drag strut, an actuating mechanism for extending and retracting the landing gear, and as a downlock for locking the gear in its extended position. This mechanism may be said to comprise, generally, an actuating cylinder 26 and piston 27 connected between the strut 13 and the airplane structure, a barrel 28 in surrounding or telescopic relation with the cylinder 26 and having means cooperable therewith to lock the gear in the extended or down position and a cylinder and piston means 30 for turning the barrel 28 between the locked and unlocked positions.

The cylinder 26 and piston 27 constitute a combination or unit which has one end hingedly or pivotally connected with the strut 13 by a pin 31 engaged in a clevis 32 on one side of the strut at a point spaced outwardly from its hinge pin 9. In practice the outer or exposed end of the cylinder 26 is secured in the clevis 32. The piston 27 is provided at its outer end with a fork 33 hingedly secured to a block or bearing 34 in a relatively short link 35. This link 35 is, in turn, secured to the air frame structure by a double axes gimbal type mounting having one hinge pin 36 coincident with the above mentioned axis A and having its second pivot or hinge pin 37 at right angles thereto. The link 35 is controlled or given angular movement by a longer link 38. A clevis arrangement 40 hingedly connects one end of the link 38 with the strut 13 at a point adjacent but spaced from the hinge pin 9 of the strut. The other end of the link 38 is forked or yoked to straddle the end of the short link 35 and is connected thereto by a pin 41. The link 38, or a portion thereof, is double or forked to straddle or receive a portion of the barrel 28 as shown in Figures 4 and 5. The link 38 serves to impart angular movement to the short link 35 moving it between the positions shown in Figures 4 and 5 when the landing gear is moved between the extended and retracted positions.

Referring now to the actuating cylinder 26 and piston 27, best shown in Figures 6 and 7, it will be seen that the cylinder telescopes or slides over the piston 27 and is provided at its end with an internal bushing or ring 42 carrying a seal 43. The piston 27 includes an elongate tubular body 44 and the seal 43, just mentioned, slidably seals with the exterior of this piston body. The fork or yoke 33, for facilitating connection of the piston 27 with the link 35, may be integral with an end of the piston rod or body 44. The other, or inner end of the piston body 44, has what may be termed a piston head 45, and this head is provided with an external seal 46 for slidably sealing with the internal wall of the cylinder 26. As best seen in Figure 6, there is an annular chamber 47 between the wall of the cylinder 26 and the piston body 44, closed or sealed at its ends by the seals 43 and 46. This chamber 47, of course expands and contracts axially during relative movement between the cylinder 26 and piston 27. A line 48 supplying actuating fluid pressure to the cylinder 26 communicates with a port 49 and a second line 50 communicates with a port system 51 to supply actuating fluid pressure to the interior of the piston 27.

The piston 27 is provided with a combination or arrangement of valves for controlling the flow or application of the actuating fluid pressure. The piston head 45 has a central bore 52 provided with a liner 53 secured therein and also secured and sealed in the adjacent portion of the tubular piston rod or body 44. This liner 53 has an internal annular seat 54 and a series of spaced radial ports 55 passes through the walls of the liner and piston to extend between the interior of the liner and the above described annular cylinder chamber 47. A poppet valve 56 is slidable in the liner 53 and controls the ports 55 by cooperating with the seat 54. A spring 57 normally urges the valve 56 closed against its seat 54. When the oil or fluid is admitted under pressure to the cylinder 26 from the line 48, the pressure acts on the poppet valve 56 to open or unseat the same. When the valve 56 is open the chamber 47 is placed in communication with the interior of the cylinder 26 ahead of the piston head 45 and the pressure in this chamber 47 is equal to the pressure ahead of the piston. Thus the effective area of the piston 27 is reduced and, in practice, the area of the piston acted upon by the fluid pressure in extending the landing gear is equal only to the external diameter of the piston rod or body 44, that is, the effective area of the seal 43. Thus, even though the actuating fluid may be supplied under high pressure the force actually employed to extend the landing gear is relatively low. The reason for thus reducing the gear extending force will be subsequently explained.

The fluid pressure in the cylinder 26 ahead of the piston 27 and effective on the reduced or limited area of the piston as just described, acts to extend the cylinder over the piston and thus move the landing gear to its extended or operative down position. The valve means of the cylinder and piston mechanism further includes an annular internal seat 58 in the portion of the liner 53 secured and sealed in the piston rod or body 44 and a series of ports 59 is formed in the liner adjacent and behind the seat. A poppet valve 60 is slidable in the liner 53 and cooperates with the seat 58 to control the ports. The ports 59 lead to an annular space 61 between the liner 53 and the wall of the piston body 44 and this space, in turn, leads to a series of axial grooves 62 which extend to an annular groove 63. This annular groove 63 is intersected by the above described ports 55 which, in turn, communicate with the chamber 47, as already described. Fluid under pressure admitted to the piston rod or body 44 from the line 50 unseats the valve 60 and is thus admitted to the chamber 47. The fluid pressure in the chamber 47 between the piston head 45 and the ring 42 serves to contract the cylinder 26 over the piston 27 and thus retract the landing gear. There is a space 64 behind the valve 60 ported to the annular space 61 so as to permit free movement of the valve and the valve has a seal 66 cooperating with the external surface of a tubular member 68 secured within the liner. The above mentioned spring 57 serves to normally hold the valve 60 in its closed position, the spring being arranged under compression between the heads of the two valves 56 and 60. A relatively small port 65 is provided in the head of the valve 60 to bleed the space within the liner 53 and member 60. It may be noted that the effective diameter of the valve seat 58 is somewhat larger than the effective diameter of the seal 66 whereby the area of the valve 60 acted upon by the active fluid pressure from the line 50 is greater than the area of the valve exposed at the space 64 and within the member 68 so that the actuating pressure is operable to open the valve.

The barrel 28 is a tubular member engaged on the piston 27 at or adjacent its attaching yoke 33 and the barrel extends therefrom in spaced surrounding relation to the piston body 44 so as to receive the cylinder 26 with clearance. The barrel 28 serves as a load carrying or supporting strut when the landing gear is extended and thus the invention provides a construction wherein the actuating cylinder and piston means 26—27 is within, at least in part, a tubular strut or barrel 28. The inner end of the barrel 28 is swivelly or rotatably secured on the piston unit at the yoke 33. The end of the barrel 28 is thickened and has an internal collar 70 secured therein. This collar 70 is freely turnable on the shank of the yoke 33 between a shoulder 71 and a nut 72. The other end of the barrel 28 has a seal or wiper ring 73 for engaging around the cylinder.

As mentioned above, the cylinder 26 and barrel 28 have cooperable locking parts operable to retain or lock the landing gear strut 13 in its extended or down position. The downlock means of the invention includes circumferentially spaced lugs or projections 74 on the exterior of the cylinder 26 freely operable or movable in longitudinal grooves or ways 75 in the wall of the barrel 28, see Figures 6, 8 and 9. As shown in the drawings there may be three equally spaced lugs or projections 74 and three complementary ways 75. The lugs 74 are provided adjacent the inner end of the cylinder 26 and the ways 75 extend longitudinally from the collar 70 or adjacent thereto to adjacent the outer end of the barrel 28 where they join or terminate at an annular undercut or internal groove 76 in the barrel. The ways 75 are spaced apart circumferentially to leave longitudinally extending splines 77 on the internal wall of the barrel 28 and these splines terminate at the annular groove 76. The groove 76 is shaped and proportioned to receive the lugs or projections 74 of the cylinder 26 upon turning or angular movement of the barrel 28 relative to the cylinder when the cylinder is moved to its extended position, shown in Figure 7. A stop 78 is provided in the annular groove 76 and is engageable with one of the lugs 74 to stop or terminate such relative movement and thus position the ends of the splines 77 in axial alignment with the lugs 74 so the lugs and splines cooperate to lock the cylinder 26 in its extended position. The stop 78 may be in the nature of a frusto-conical head on the inner end of a stud or bolt 79 engaged through an opening in the wall of the barrel, the stud being secured in place by a nut 80.

The means 30 is provided to effect turning or angular movement of the barrel 28 in one direction to bring the ends of the splines 77 into axial alignment with the lugs or projections 74 and thus lock the cylinder 26 in the extended position as just described, and is also operable to turn the barrel in the opposite direction to return the ways 75 into axial alignment with the lugs 74 so that the cylinder 26 may return to its retracted position to retract the landing gear into its stowage compartment 11. The means 30 includes a cylinder 81 having a bracket portion 82 secured to the yoke part 33 of the piston assembly 27 by screws or studs 83. It is preferred to have the cylinder 81 lie adjacent to the barrel 28 so as to make the mechanism as compact as possible although the cylinder may be arranged in other positions if desired. A piston 84 operates in the cylinder 81 and has a tubular head 85 having sliding sealing engagement with the wall of the cylinder 81 and with an internal tubular guide 86 fixed in the cylinder. The outer end of the piston 84 has a yoke 87 and the end portion of the barrel 28 adjacent its collar 70 has spaced external ears 88. A system of pivotally connected links 90 has one end attached to the piston yoke 87 and its other end attached at the ears 88 and is operable to transmit movement from the piston 84 to the barrel 28. The linkage 90 is such that axial or reciprocal movement of the piston 84 results in rotation or angular movement of the barrel 28.

The above mentioned port system 51, which receives actuating fluid pressure from the line 50, and which communicates with the interior of the actuating piston 27, has a branch port 92 extending through the bracket portion 82 to the inner end of the turning cylinder 81. Thus it will be seen that when fluid pressure is supplied to the piston 27 to retract the landing gear, pressure is also simultaneously supplied to the inner end of the cylinder 81 to actuate the piston 84 and thus turn the barrel 28 to the position where the ways 75 are aligned with the cylinder lugs or projections 74 to receive the same whereby the cylinder 26 is free to be actuated to its contracted position to retract the landing gear. A port 93 communicates with the outer portion of the turning cylinder 81 and a line 94 extends from this port to the fluid pressure supply line 48. With this arrangement actuating fluid pressure is simultaneously supplied to the outer ends of the cylinders 26 and 81. Actuating fluid pressure supplied to the outer end of the turning cylinder 81 tends to move the piston 84 to the right, as viewed in Figure 6, and thus tends to turn the barrel 28. However, as the lugs 74 are engaged in the grooves or ways 75 until the landing gear is fully extended, the barrel cannot turn relative to the cylinder 26 and the lugs are merely urged against the side walls of the ways 75 as the cylinder 26 and the landing gear are extended. When the cylinder 26 reaches its fully extended position where the landing gear is fully extended, the lugs 78 will have reached the annular groove 76 and the torque being maintained or exerted by the cylinder and piston means 30 suddenly turns the barrel 28 to bring the splines 77 into axial alignment with the lugs 74 and to bring the stop 78 against one of the lugs 74 and thus stop the barrel in the angular position where the lugs and splines cooperate to lock the landing gear in its extended position.

The turning cylinder and piston means 30 preferably includes a helical spring 96 arranged under compression between the outer head of the cylinder 81 and the piston 84 to yieldingly urge the piston to the right, as viewed in Figure 6, and to turn the barrel to the locked position just described in the event of failure or loss of the actuating fluid pressure. In this connection it may be observed that the landing gear will lower by gravity to its fully extended position in the event of such fluid pressure failure and the spring 96 will turn the barrel 28 to engage the splines 77 behind the lugs or projections 74 and thus lock the landing gear in its fully extended position.

Figure 2 illustrates another use or application of the invention. In this case the landing gear comprises a typical shock absorbing strut 97 of the oleo type mounted at its upper end to the airplane structure 98 and provided at its lower end with a landing wheel 99. The strut 97 is adapted to be moved between a retracted stowed position illustrated in broken lines, and the extended full line position of Figure 2. The actuating and locking mechanism of the invention is provided to actuate the strut 97 between these two positions and to lock the same in the extended position. I have shown the outer end of the cylinder 26 connected with a link 100 which, in turn, is connected with the strut 97 to move the same. The yoke 33 of the piston 27 is suitably anchored to the airplane structure 98 in such a manner that the mechanism may swing to a compact stowed position when the strut is retracted. It will be observed from Figures 1 and 2 that the gear actuating and locking mechanism of the invention is well adapted for various types of landing gear installations.

It is believed that the operation of the mechanism of the invention will be readily understood from the foregoing detailed description. To extend the landing gear the actuating fluid under pressure is supplied to the line or pipe 48 to simultaneously enter the ports 49 and 93 above the cylinders 26 and 81. At this time the projections or lugs 74 of the cylinder 26 are engaged in the ways 75 and the turning force or torque produced by the turning cylinder and piston mechanism 30 merely holds the lugs 74 against the sides of the splines 77. As previously described, actuating fluid pressure admitted to the cylinder 26 through the port 49 actuates or extends the cylinder 26 and moves the landing gear strut 13 to its extended position. During this extension of the landing gear the lugs 74 merely slide along the splines 77. As previously described in connection with the action of the cylinder 26 and the poppet valve 56, the force developed to extend the landing gear is minimized or reduced by reason of the maintenance of full fluid pressure in the chamber 47 behind the piston head 45. Accordingly, the torque required to lock the cylinder and piston mechanism 26 and 27 with the landing gear strut 13 in its extended position is appreciably reduced. When the landing gear strut 13 reaches its fully extended position the lugs 74 will have reached the annular groove 76 and the turning force or torque being maintained by the cylinder and piston means 30 turns the barrel 28 to bring the splines 77 into axial alignment with the cylinder lugs 74 and to engage the stop 78 against one of the lugs and thus stop the barrel in the locked position. The engagement of the splines 77 with the lugs 74 positively locks the landing gear in the extended position and it may be observed that the swivel collar 70 engaged between the nut 72 and the shoulder 71 is a load assuming element capable of positively holding the landing gear in the airplane-supporting extended position.

To retract the landing gear actuating fluid under pressure is supplied to the line 50 to simultaneously flow through the ports 51 and 92. The fluid pressure admitted to the inner end of the cylinder 81 turns the barrel 28 to bring its ways 75 into alignment with the cylinder lugs 74 and the fluid pressure admitted to the interior of the piston rod 44 opens the poppet valve 60, as above described, and enters the space between the piston head 45 and the cylinder bushing 42 to move the cylinder 26 and the landing gear strut 13 to the retracted positions. During the retraction of the landing gear the cylinder lugs 74 slide through the ways 75 and remain therein throughout the retraction stroke.

It is to be observed that the landing gear actuating and locking mechanism of the invention is extremely compact, the strut barrel 28 being in telescopic or surrounding relation to the cylinder 26 and piston 27 and the locking means being internally associated with the barrel and with the cylinder. The compactness of the arrangement particularly well suits it for use in conjunction with the landing gear of high-speed fighter aircraft and the like, although, of course, it is not confined to such applications.

Having described only a typical form of the invention I do not wish to be limited to the specific details herein set forth, but wish to reserve to myself any variations or modifications that may appear to those skilled in the art and fall within the scope of the following claims.

I claim:

1. In an aircraft having a landing gear movable between a retracted position and an extended position the combination of; a mechanism connected between the craft and gear operable to move the gear between the retracted and extended positions, the mechanism including two elements, one a cylinder, the other a piston, and means for locking the gear in the extended position comprising a projection on one of said elements, a barrel turnably secured to the other element and turnable into and out of locking engagement with said projection, and means for turning the barrel.

2. In an aircraft having a landing gear movable between a retracted position and an extended position the combination of; a mechanism connected between the craft and gear operable to move the gear between the retracted and extended positions, the mechanism including two elements, one a cylinder, the other a piston, and means for locking the gear in the extended position comprising a projection on one of said elements, a barrel in surrounding relation to said elements and turnably anchored on the other element, a part on the barrel, and means for turning the barrel to move said part into locking engagement with said projection when the gear is extended.

3. In combination with an airplane and a landing gear therefor movable between a retracted and an extended position; a mechanism for moving the gear between said positions including a piston secured to the airplane, a cylinder secured to the gear and slidably receiving the piston, and means supplying fluid pressure to the mechanism to actuate the same, and means for locking the gear in the extended position comprising a barrel spaced around the piston and adapted to receive the cylinder, a swivel connection between an end of the barrel and the piston, cooperable lock parts on the cylinder and barrel engageable when the gear reaches its extended position, and means for turning the barrel to move said parts into and out of cooperation.

4. In combination with an airplane and a landing gear therefor movable between a retracted and an extended position; a mechanism for moving the gear between said positions including a piston secured to the airplane, a cylinder secured to the gear and slidably receiving the piston, and means supplying fluid pressure to the mechanism to actuate the same, and means for locking the gear in the extended position comprising a barrel spaced around the piston and adapted to receive the cylinder, a swivel connection between an end of the barrel and the piston, cooperable lock parts on the cylinder and barrel engageable when the gear reaches its extended position, and fluid pressure actuated means for turning the barrel to move said parts into and out of cooperation.

5. In combination with an airplane and a landing gear therefor movable between a retracted and an extended position; a mechanism for moving the gear between said positions including a piston secured to the airplane, a cylinder secured to the gear and slidably receiving the piston, and means supplying fluid pressure to the mechanism to actuate the same, and means for locking the gear in the extended position comprising a barrel spaced around the piston and adapted to receive the cylinder, a swivel connection between an end of the barrel and the piston, internal splines on the barrel, the barrel having an internal annular groove at one end of the splines, lugs on the cylinder slidable between the splines during extension and retraction of the gear, and means for turning the barrel when the gear is fully extended to move the lugs into the groove to lock the gear extended.

6. In combination with an airplane and a landing gear therefor movable between a retracted and an extended position; a mechanism for moving the gear between said positions including a piston secured to the airplane, a cylinder secured to the gear and slidably receiving the piston, and means supplying fluid pressure to the mechanism to actuate the same, and means for locking the gear in the extended position comprising a barrel spaced around the piston and adapted to receive the cylinder, a swivel connection between an end of the barrel and the piston, internal splines on the barrel, the barrel having an internal annular groove at one end of the splines, lugs on the cylinder slidable between the splines during extension and retraction of the gear, means for turning the barrel when the gear is fully extended to move the lugs circularly in the groove, and stop means for stopping the lugs in the groove where they are in line with and and engage the splines to lock the gear in the extended position.

7. In combination with an airplane and a landing gear therefor movable between a retracted and an extended position; a mechanism for moving the gear between said positions including a piston secured to the airplane, a cylinder secured to the gear and slidably receiving the piston, and means supplying fluid pressure to the mechanism to actuate the same, and means for locking the gear in the extended position comprising a barrel spaced around the piston and adapted to receive the cylinder, a swivel connection between an end of the barrel and the piston, internal splines on the barrel, the barrel having an internal annular groove at one end of the splines, lugs on the cylinder slidable between the splines during extension and retraction of the gear, cylinder and piston means for exerting a turning force on the barrel to cause the lugs to turn in the groove when the gear is fully extended, and stop means for stopping the lugs in the groove where they are in line with and cooperate with the splines to lock the gear in the fully extended position.

8. In combination with an airplane and a landing gear therefor movable between a retracted and an extended position; a mechanism for moving the gear between said positions including a piston secured to the airplane, a cylinder secured to the gear and slidably receiving the piston, a first line for conducting actuating fluid pressure to one end of the cylinder to extend the gear, a second line for conducting actuating fluid pressure to the other end of the cylinder to retract the gear, and means for locking the gear in the extended position comprising a barrel spaced around the piston to receive the cylinder and swivelly connected at one end to the piston to be turnable thereon, internal splines on the barrel, the barrel having an internal annular groove at one end of the splines, lugs on the cylinder slidable axially between the splines during operation of the cylinder and piston mechanism, the lugs being adapted to enter said groove when the gear is fully extended, cylinder and piston means for exerting a turning force in a first direction on the barrel as the gear is extended to cause the lugs to turn in said groove when the gear reaches its fully extended position and for exerting a turning force in the other direction to turn said lugs in the other direction in said groove to reengage between the splines when the gear is retracted, and stop means to limit turning movement of the lugs in said groove to cause them to lock against the splines to hold the gear in the extended position.

9. In combination with an airplane and a landing gear therefor movable between a retracted and an extended position; a mechanism for moving the gear between said positions including a piston secured to the airplane, a cylinder secured to the gear and slidably receiving the piston, a first line for conducting actuating fluid pressure to one end of the cylinder to extend the gear, a second line for conducting actuating fluid pressure to the other end of the cylinder to retract the gear, and means for locking the gear in the extended position comprising a barrel spaced around the piston to receive the cylinder and swivelly connected at one end to the piston to be turnable thereon, internal splines on the barrel, the barrel having an internal annular groove at one end of the splines, lugs on the cylinder slidable axially between the splines during operation of the cylinder and piston mechanism, the lugs being adapted to enter said groove when the gear is fully extended, a stop in the groove for stopping the lugs where they cooperate with the splines to lock the gear against retraction, a cylinder and piston device for turning the barrel, a conduit leading from said first line to the device to cause the device to exert a turning force on the barrel in one direction as the gear is extended so that the lugs enter said groove and engage said stop, and a second conduit leading from said second line to said device to cause the device to exert a turning force on the barrel in the other direction to re-enter the lugs between the splines to allow retraction of the gear.

10. An actuating and locking mechanism of the character described comprising two elements related for relative axial movement, one a cylinder, the other a piston, a projection on one of the elements, a barrel around said element having a longitudinal way slidably receiving the projection during substantially the entire relative stroke of the elements and having a lateral groove extending from the way, means turnably securing the barrel to the other elements, and means for exerting a turning force on the barrel during relative axial movement between the elements to cause the groove to receive the projection when said elements reach given relative positions.

11. An actuating and locking mechanism of the character described comprising two elements related for relative axial movement, one a cylinder, the other a piston, a projection on one of the elements, a barrel rotatably anchored to the other element to surround substantial portions of the cylinder and piston, the barrel having an internal axial way slidably receiving the projection and a groove extending laterally from the way, and means for exerting a turning force on the barrel to cause the groove to receive the projection and thus lock the elements in predetermined relative axial positions.

12. An actuating and locking mechanism of the character described comprising two elements related for relative axial movement, one a cylinder, the other a piston, a projection on one of the elements, a barrel rotatably anchored to an element to surround a major portion of the same, the barrel having an elongate axial way slidably receiving the projection during substantially the entire relative axial movement of the elements and a groove extending laterally from an end of the way, and means for applying a turning force to the barrel so that the groove receives the projection to lock the elements against further relative axial movement.

13. An actuating and locking mechanism of the character described comprising two elements related for relative axial movement, one a cylinder, the other a piston, a projection on the exterior of the cylinder, a barrel rotatably anchored to an end of the piston to surround the piston and to receive the cylinder, the barrel having an elongate axial way slidably receiving the projection on the cylinder and a groove extending laterally from an end of the way, and means for turning the barrel in one direction at the end of the relative stroke of the elements to have the groove suddenly receive the projection to lock the elements against relative movement and thereafter operable to turn the barrel in the other direction to bring the way in receiving relation to the projection.

References Cited in the file of this patent

UNITED STATES PATENTS

| 1,129,741 | Shannon | Feb. 23, 1915 |
| 1,724,926 | Gregory | Aug. 20, 1929 |
| 2,373,385 | Davie | Apr. 10, 1945 |
| 2,677,515 | Perry | May 4, 1954 |
| 2,692,739 | Martin et al. | Oct. 26, 1954 |

FOREIGN PATENTS

| 479,532 | Great Britain | Feb. 8, 1938 |
| 608,704 | Great Britain | Sept. 20, 1948 |